US011989997B2

(12) United States Patent
Randel et al.

(10) Patent No.: US 11,989,997 B2
(45) Date of Patent: May 21, 2024

(54) INTEGRATING SYSTEM-BASED CONTENT AND GAME CONTENT

(71) Applicant: LNW Gaming, Inc., Las Vegas, NV (US)

(72) Inventors: Robert J. Randel, Northfield, NJ (US); Rolland Steil, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 69 days.

(21) Appl. No.: 17/831,885

(22) Filed: Jun. 3, 2022

(65) Prior Publication Data

US 2022/0398894 A1 Dec. 15, 2022

Related U.S. Application Data

(60) Provisional application No. 63/209,246, filed on Jun. 10, 2021.

(51) Int. Cl.
*G07F 17/32* (2006.01)

(52) U.S. Cl.
CPC ...... *G07F 17/3211* (2013.01); *G07F 17/3223* (2013.01)

(58) Field of Classification Search
None
See application file for complete search history.

(56) References Cited

U.S. PATENT DOCUMENTS

| | | | | |
|---|---|---|---|---|
| 6,379,246 | B1 | 4/2002 | Dabrowski | |
| 6,517,433 | B2 | 2/2003 | Loose et al. | |
| 7,335,106 | B2 | 2/2008 | Johnson | |
| 8,029,364 | B2 | 10/2011 | Loose et al. | |
| 8,057,303 | B2 | 11/2011 | Rasmussen et al. | |
| 8,226,459 | B2 | 7/2012 | Barrett et al. | |
| 8,241,123 | B2 | 8/2012 | Kelly et al. | |
| 8,342,935 | B1 | 1/2013 | Morrow et al. | |
| 8,388,424 | B2 | 3/2013 | Dabrowski | |
| 8,475,273 | B2 | 7/2013 | Kelly et al. | |
| 8,512,144 | B2 | 8/2013 | Johnson et al. | |
| 10,417,356 | B1 * | 9/2019 | Arterburn | G06F 30/20 |
| 10,537,799 | B1 * | 1/2020 | Burke | G06T 15/205 |
| 10,589,171 | B1 * | 3/2020 | Burke | G06T 15/00 |
| 2007/0243934 | A1 | 10/2007 | Little et al. | |
| 2008/0161107 | A1 | 7/2008 | Johnson | |
| 2009/0233705 | A1 | 9/2009 | Lemay et al. | |

(Continued)

*Primary Examiner* — Ronald Laneau

(57) ABSTRACT

A method and system to integrate system-based content and game content. A system includes an electronic display manager configured to generate, in response to receiving user input, a video stream of system-based content. The system also includes an electronic game controller communicatively coupled to the electronic display manager via an external-system interface. The electronic game controller is configured to execute instructions that cause the system to perform operations to receive the video stream via the external-system interface, generate a video signal of game content for a wagering game, scale the video stream according to one or more scale values that relate a size of the system-based content to a size of the game content, and mix the video stream and the video signal into a composite image for presentation via a display device communicatively coupled to the electronic game controller.

14 Claims, 6 Drawing Sheets

(56) References Cited

U.S. PATENT DOCUMENTS

| | | | | |
|---|---|---|---|---|
| 2011/0263325 | A1 | 10/2011 | Atkinson | |
| 2012/0122560 | A1 | 5/2012 | Loose et al. | |
| 2020/0302734 | A1* | 9/2020 | Baker | G07F 17/3276 |
| 2022/0165198 | A1* | 5/2022 | Bogdanowicz | G02B 26/008 |

* cited by examiner

INTEGRATING SYSTEM-BASED CONTENT AND GAME CONTENT

CROSS-REFERENCE TO RELATED APPLICATION

This application claims the priority benefit of U.S. Provisional Patent Application No. 63/209,246 filed Jun. 10, 2021, which is incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022 SG Gaming, Inc.

FIELD OF TECHNOLOGY

The present invention relates generally to gaming systems, apparatus, and methods and, more particularly, to presentation and control of content via gaming systems.

BACKGROUND

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace. Furthermore, it is a significant technical challenge to present non-game content at a gaming machine in a way that is viewable by a player, yet not distracting to a presentation of game content. Some gaming machine manufacturers utilize separate displays for non-game content and game content. This requires additional hardware at the gaming machine. Furthermore, concurrent presentation of game content and non-game content on the same display device faces an added challenge of rendering large amounts of content (from various sources), at the gaming device, which can slow down, or otherwise interfere with, the gaming machine's presentation of the game content.

As the industry matures, the creativity and ingenuity required to improve such operation of gaming apparatus and games grows accordingly.

SUMMARY

According to one aspect of the present invention, a gaming system comprises an electronic display manager configured to generate, in response to receiving user input, a video stream of system-based content. The system also includes an electronic game controller communicatively coupled to the electronic display manager via an external-system interface. The electronic game controller is configured to execute instructions that cause the system to perform operations to receive the video stream via the external-system interface, generate a video signal of game content for a wagering game, scale the video stream according to one or more scale values that relate a size of the system-based content to a size of the game content, and mix the video stream and the video signal into a composite image for presentation via a display device communicatively coupled to the electronic game controller. The gaming system may be incorporated into a single, freestanding gaming machine.

Additional aspects of the invention will be apparent to those of ordinary skill in the art in view of the detailed description of various embodiments, which is made with reference to the drawings, a brief description of which is provided below.

Figure 1:
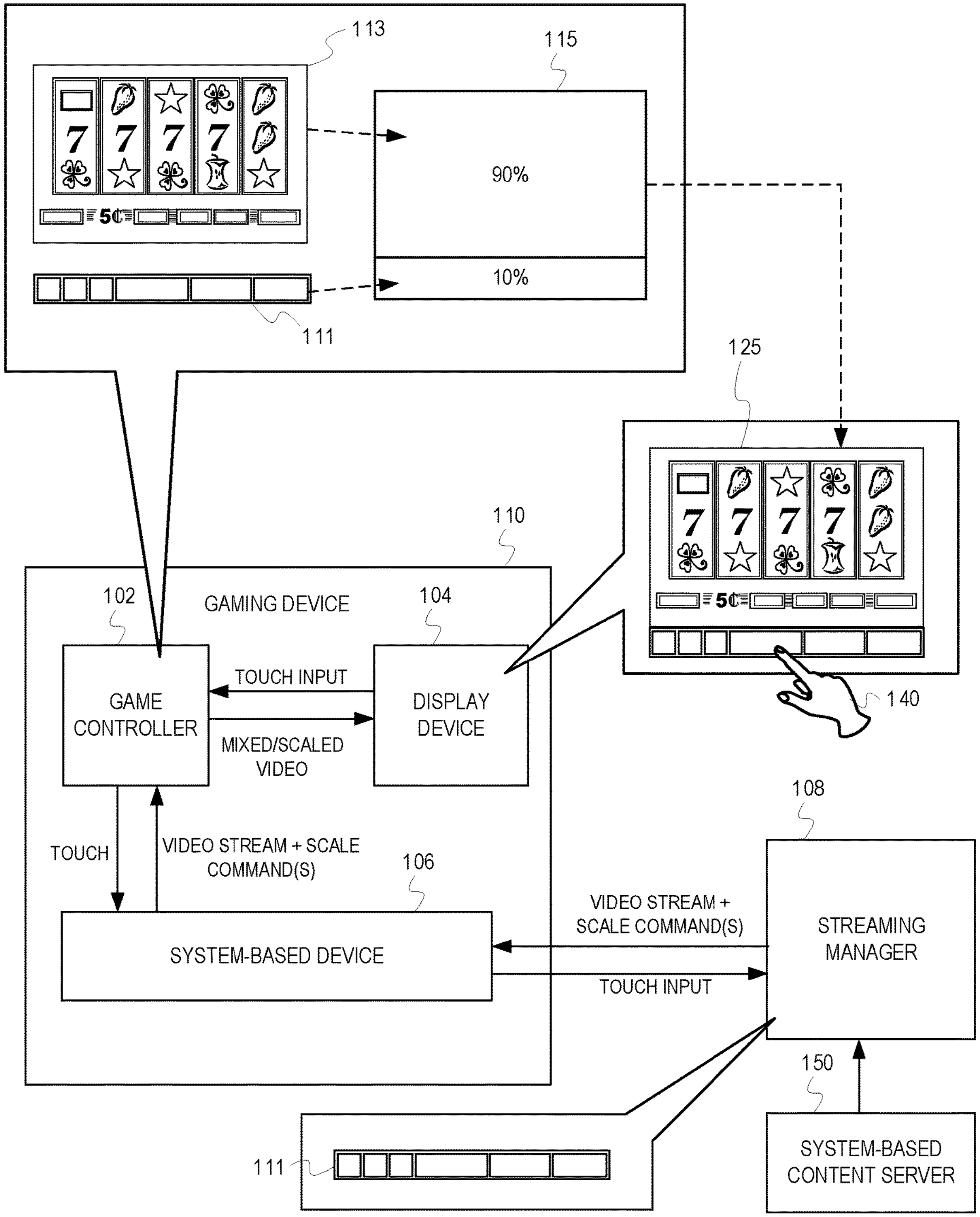
FIG. 1 is a diagram illustrating integrating system-based content and game content according to at least some aspects of the disclosed concepts.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

FIG. 1 is a diagram illustrating integrating system-based content and game content according to at least some aspects of the disclosed concepts. In FIG. 1, a streaming manager 108 is configured to detect an input signal (e.g., from a system-based device 106) then renders and streams system-based content 111 (obtained from the system-based server 150) to a game controller 102 via communication with the system-based device 106. In some embodiments, the system-based device 106 connects to the gaming device 110 via an external-system interface (e.g., see external-system interface 558 in FIG. 5). In some embodiments, the external-system interface 558 includes an expansion slot through which the system-based device 106 can connect (e.g., the system-based device 106 may connect to a bus of a motherboard and/or of a riser board via the expansion slot). In the example shown in FIG. 1, the streaming manager 108 is shown external to the gaming device 110, however, in some embodiments, the streaming manager 108 may be incorporated into the system-based device 106 and/or otherwise incorporated with (e.g., inside of, attached to, communicatively coupled to, etc.) the gaming device 110. For example, the system-based device 106, the streaming manager 108, or any combination thereof, can be connected to the external-system interface 558 of the gaming device 110. In some instances, the system-based device 106 includes hardware capable of detecting an input and generating an input signal. In some embodiments, the system-based device 106 includes a card reader, a keypad, a touch screen, etc. For example, the system-based device 106 can be an iVIEW4™ player interface device manufactured by Scientific Games Corporation or the iVIEW™ DM Display Manager device manufactured by Scientific Games Corporation.

The game controller 102 controls access to, and presentation of, game content 113. The game controller 102 also controls mixing and scaling of video content, including the mixing and scaling of a video stream of the system-based content 111 and a video signal of the game content 113 to generate a composite image 125 that includes both the game content 113 and the system-based content 111. Depending on a required screen area for presentation of the system-based content 111, the streaming manager 108 renders and transmits the video stream of the system-based content 111 along with scale commands, or in other words, electronic instructions that specify one or more scale values that relate a size of the game content 113 relative to a size of the system-based content 111 via the same display (or set of displays). For example, the scale commands include one or more scale values that the game controller 102 uses to scale and mix the video signal of the game content 113 with the streamed video of the system-based content 111. For example, the scale command may specify a scale structure 115 (e.g., a scale template) that includes scale values for one or more dimensions (e.g., width and height) of certain types of content. In the absence of presenting the system-based content 111, the game controller 102 is configured to transmit and present the game content 113 via the display device 104 to take up an entire screen area for the display device 104. However, with the addition of the system-based content 111, a portion of the screen area (e.g., the bottom 10% of the screen area) is indicated as being the screen area for the system-based content 111, whereas the remainder of the screen area (e.g., the top 90% of the screen area) is indicated as being the screen area for the game content 113. For example, the scale structure 115 scales the height of the game content 113 down to ninety percent (e.g., 90%) of the height of the screen area of the display device 104. In some examples, as shown in FIG. 1, the scale structure 115 scales down the height of the game content 113, whereas the width remains the width of the screen area of the display device 104. In other instances, however, the scale value may affect both the height and width of the game content 113. Concurrently, the scale structure 115 scales the system-based content 111 to fit into ten percent (e.g., 10%) of the height of the screen area of the display device 104. The game controller 102 also scales the width of the system-based content 111 to fit to the width of the display device 104. The display device 104 receives the scaled and mixed video content, and presents the composite image 125 of the game content 113 and the streamed system-based content 111. Given that the streaming manager 108 renders and streams the system-based content 111 externally from the game controller 102, then the processor (e.g., CPU 542 in FIG. 5) of the game controller 102, and/or any processor associated with the system-based device 106, is improved by being freed of any requirements to render the system-based content 111 prior to mixing video signals. Because the system-based content 111 is streamed (by a different processor than that of the game controller 102) in its rendered form before arriving at the gaming device 110, then the hardware associated with the gaming device 110 can be primarily dedicated to scaling and presentation of the already rendered and streamed version of the system-based content 111, as opposed to having to perform the render the system-based content 111 by the processor of the game controller 102.

In some embodiments, the display device 104 is configured to receive touch inputs. In some embodiments, the game controller 102 detects the coordinates of a touch input 140 and determines whether the touch input 140 was related to the first portion of the screen area of the display device 104 that is designated for the game content 113 or whether the touch input 140 was related to a second portion of the screen area of the display device 104 what is designated for the system-based content 111. If the game controller 102 determines that the touch input 140 is related to the game content 113, then the game controller 102 transforms the coordinates based on the scale value and determines, based on the transforming, a particular game function to perform, then performs that game function. If, however, the game controller 102 determines that the touch input 140 is related to the system-based content 111, then the game controller 102 transmits the information for the touch input 140 (e.g., the touch coordinates) to the streaming manager 108. The streaming manager 108 then transforms the coordinates based on the scale value and determines, based on the transforming, a particular system-based function (e.g., operation, algorithm, sub-routine, etc.) to perform. In some instances, the system-based function alters the appearance of the system-based content 111. The streaming manager 108 modifies the appearance of the system-based content 111, renders it graphically, then transmits a stream of the rendered content to the game controller 102 via the system-based device 106. In some instances, the system-based function may require the system-based content 111 to take up a different portion of the screen area. Consequently, the display manger 108 can transmit an updated scale command with one or more updated scale values for the system-based content 111 and for the game content 113. The game controller 102 can receive the updated scale commands, then scale the game content 113 and the streamed, system-based content 111 according to the updated scale value(s).

Figure 2:
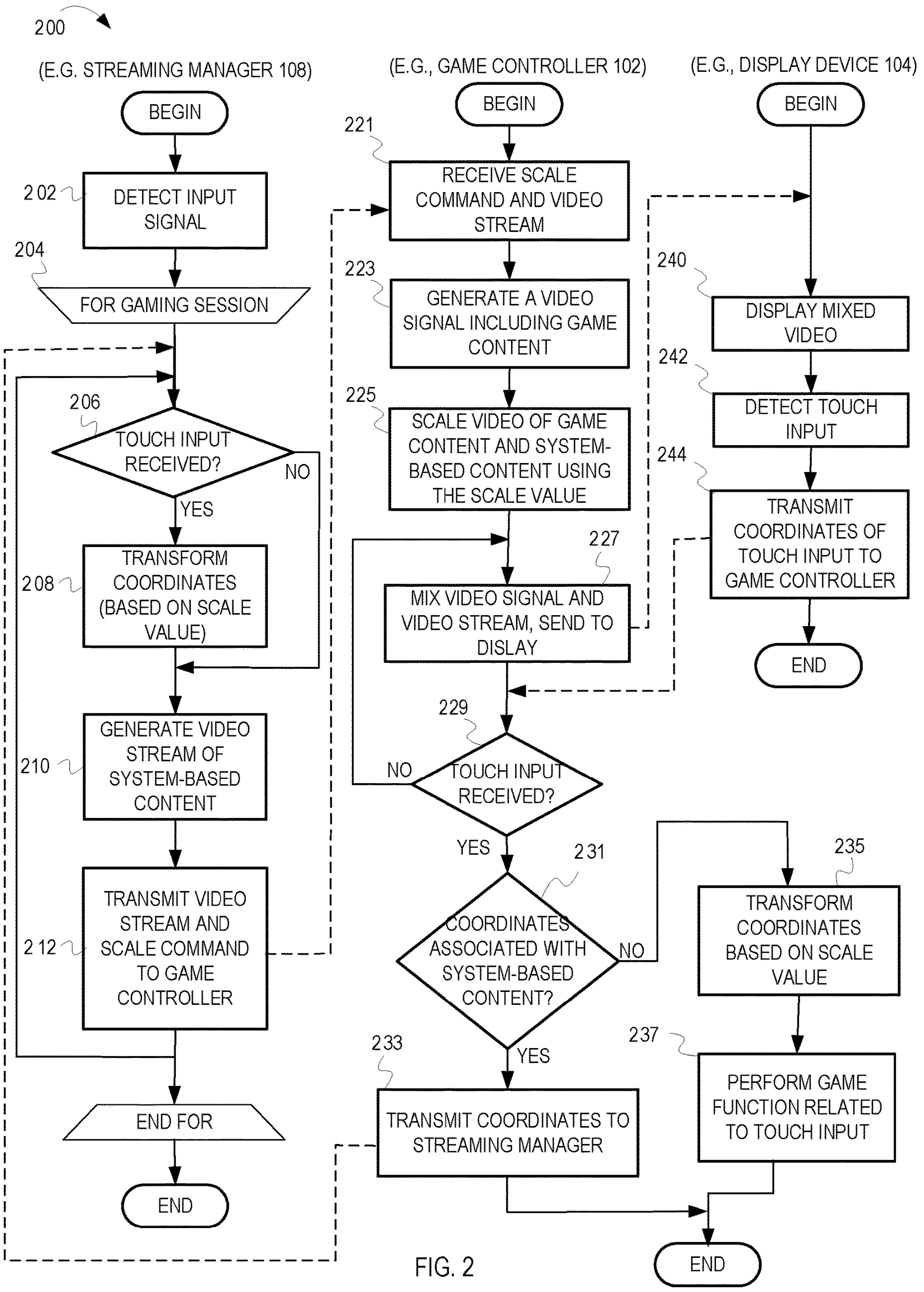
FIG. 2 is a flowchart for integrating system-based content and game content according to at least some aspects of the disclosed concepts.
Figure 3A:
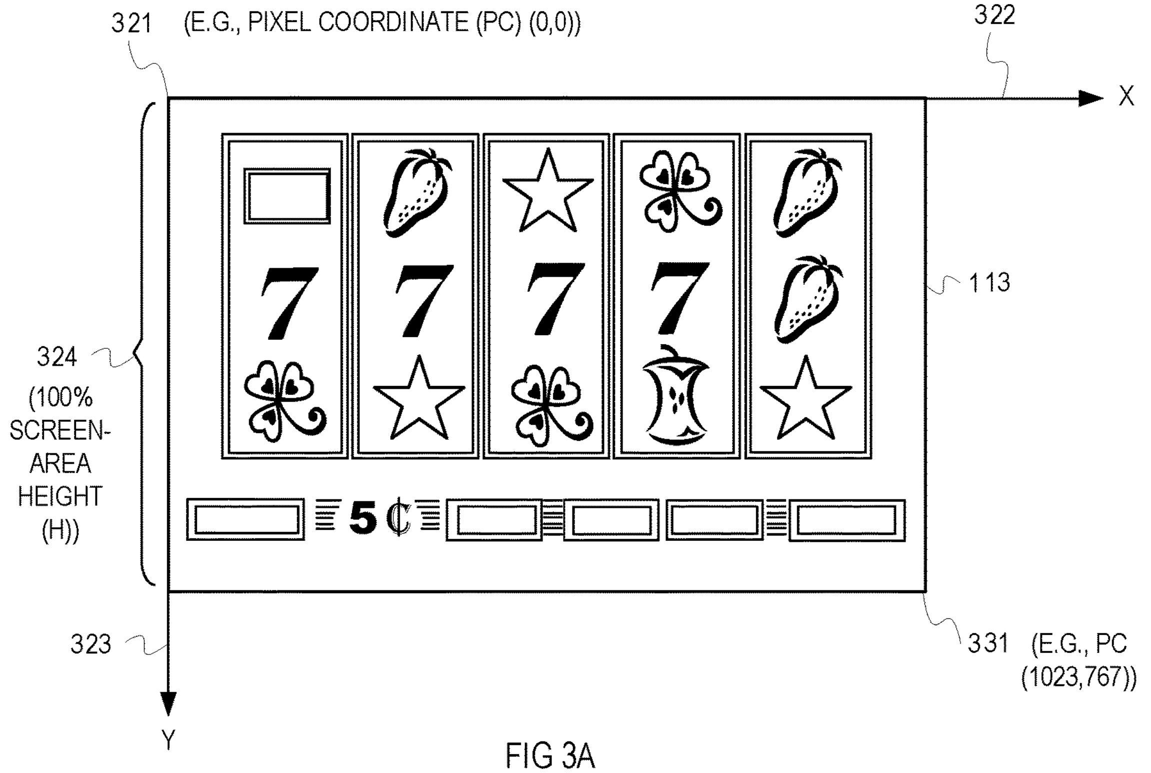
FIG. 3A and FIG. 3B are diagrams illustrating integrating system-based content and game content according in response to receiving touch input according to at least some aspects of the disclosed concepts.
Figure 3B:
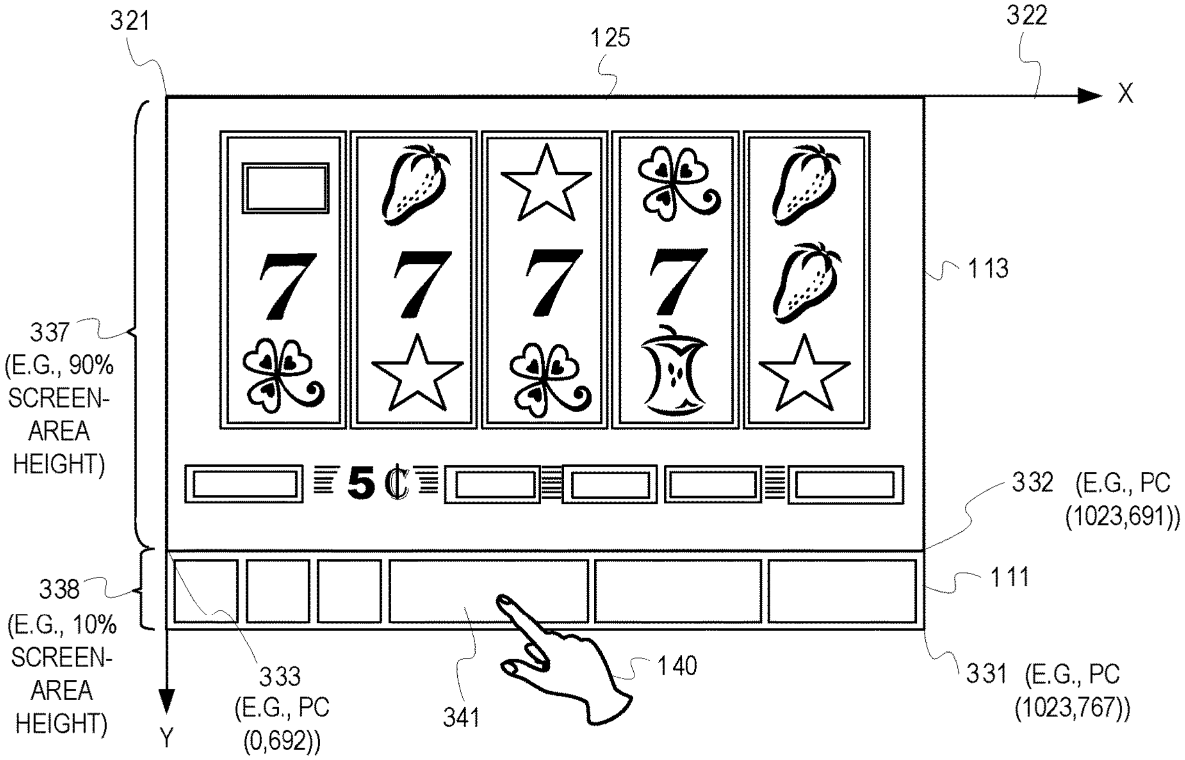

FIG. 2 is a flowchart for integrating the system-based content 111 and the game content 113 according to at least some aspects of the disclosed concepts. FIG. 2 illustrates an example flow of operations performed from the perspective of three devices, including the streaming manager 108, the game controller 102, and the display device 104. In FIG. 2, processing blocks for any given device are connected by solid lines according an order of operations for the device from its individual "begin" block to its respective "end" block. Dotted lines represent data and/or commands transmitted between devices within the flow 200. Each device may have its own respective electronic processor and/or other circuitry, to perform its respective function. FIG. 3A and FIG. 3B are diagrams illustrating integrating the video of the system-based content 111 and the game content 113 in response to receiving the touch input 140 according to at least some aspects of the disclosed concepts. FIG. 3A and FIG. 3B will be referred to concurrently with the description of the flow 200 of FIG. 2

In FIG. 2, at processing block 202, the streaming manager 108 detects an input signal. For example, as shown in FIG. 1, the streaming manager 108 detects an input signal via the system-based device 106. In some embodiments, the input signal is used to access (e.g. login to) an electronic account. The electronic account is any form of electronic account that is tied to an identity of a player at the gaming device 110. In some instances, the account may be a player loyalty account. In other instances, the account may be a financial account, such as a credit card account, a bank account, an electronic-funds-transfer account, an electronic commerce (e-commerce) account, an online money-transfer account, etc. In other instances, the account may be a social media account. In other instances, the account is an anonymous account that is associated with the player while performing face tracking. Thus, the player's identity is tracked, via the account, according to a facial map generated by a machine-learning model. Therefore, although the player's actual identity (e.g., name) is unknown, a unique identifier (e.g., the facial map) is associated with the player, even if the association is done anonymously. Thus, the system-based device 106, in some embodiments, is a biometric scanning device, such as a retina reader, a camera, or any device capable of recording a unique characteristic or trait of the player sufficient to track a player's physical location and activities at the gaming device 110 before, during, and/or after a game-play session. Regardless of the type of electronic account, the system-based device 106 is configured to detect some form of input (e.g., player input). In some embodiments, the input is used to log in, or otherwise link to, to the electronic account. Once the input is received (e.g., via at least one sensor of the system-based device 106) the streaming manager 108 initiates operations associated with the electronic account. Those operations utilize system-based content. This disclosure will refer to any content that is not game content as "system-based content". The system-based content may include, but is not necessarily limited to, content related to player benefits, casino services, marketing bonuses, promotions, advertisements, beverage or dining services, or any other information that is relevant to the player's gaming experience other than the wagering game itself. The content for the wagering game is referred to herein as game content. Game content, for instance, includes game assets of the wagering game, content related to a bet placed on the game (e.g., bet meters, pay tables, payout/collection, credit meters, number of lines selected for betting, an amount bet per line, a maximum bet, etc.), game play elements of the game (e.g., reels, indicia, game symbols), game instructions, etc.

In some embodiments, the detected input is used to obtain (and display) system-based content without necessarily triggering a game play session. For example, the gaming device 110 may include a button that a user can press to merely request certain information about the casino property, but without triggering a game play session. Thus, some game content may be presented (concurrently with the system-based content) without actually playing a game, such as non-game-play mode (e.g., a preview of a game or a game in an attract mode). Thus, in some embodiments, the game content is any content presented by the game controller 102 that is related to (or designated for) the wagering game available on the gaming device 110, such as game content displayed in the non-game-play mode (e.g., an attract mode) as well as game content displayed, and used, during a game-play mode.

Referring momentarily back to FIG. 2, the flow 200 continues at processing block 204, where the streaming manager 108 initiates a loop 204. In some embodiments, the loop 204 continues for a certain duration of time or for a specific purpose, such as to access system-based content before, during, or after playing the game content. In some embodiments, the loop 204 continues for a duration of a gaming session. For example, the loop 204 continues from the moment the input signal is received from the system-based device 106 (e.g., a login signal), which provides options for accessing the system-based content and/or for game play (such as giving access to a player account with gambling funds, presenting a library or game themes to select from, etc.) until an additional input signal is received to terminate a gaming session (e.g., a log out signal).

Referring again to FIG. 2, the flow 200 continues at processing block 206, where the streaming manager 108 determines whether there is a touch input 140 received via the display device 104. The touch input 140 indicates a selection of either the game content 113 or the system-based content 111 via the composite image 125. If the touch input 140 is received, then the flow 200 continues at processing block 208, where the streaming manager 108 transforms (based on the scale value) touch coordinates for the touch input 140 to determine the portion of the system-based content 111 that was selected by the touch input 140. In response to determining the portion of the system-based content 111 that was selected (i.e., touched), the streaming manager 108 can further determine an operation(s) to perform for the selected portion of the system-based content 111. The streaming manager 108 then automatically performs the operations. The performance of the operations can modify the appearance of the system-based content 111. Thus, at processing block 210, the streaming manager 108 renders the system-based content 111 in response to performing the operation(s) associated with the touch input 140 and generates a video stream of the system-based content 111. If, however, at processing block 206, the display manger 108 detects no touch input 140 related to the system-based content 111, then at processing block 210, the display manger 108 renders the system-based content 111 and determines whether the rendered content would properly fit (e.g., whether the rendered content would be adequately viewable) given any previous scale values. If the scale value needs to be modified, then at processing block 212, the display manger 108 determines the appropriate scale value and transmits the video stream, along with a scale command (which specifies the scale value(s) needed for the proper presentation of the system-based content 111). In some instances, such as in the case where no touch input is received via the display device 104, the streaming manager 108 can transmit a scale command having a default scale value (e.g., the scale value(s) for the scale structure 115). In other embodiments, the game controller 102 is set to display mixed video of game content 113 and system-based content 111 according to a default scale value. Thus, in some embodiments, the default scale value (e.g., the scale structure 115) is stored via the gaming device 110, and does not require to be sent as a scale command at processing block 212 unless the scale value needs to be changed according to any modification in appearance to the system-based content 111 that would require the system-based content 111 to be expanded (e.g., to take up more of the screen area of the display device 104) or to be shrunken (e.g., to take up less of the screen area of the display device 104).

In some embodiments, the streaming manager 108 provides the system-based content 111 via an internet communications protocol. Thus, the system-based content 111 can be browser based (e.g., HTML 5), and the scale structure 115 can be a browser with two windows (or sections) as shown in FIG. 1 (e.g., the upper window taking up 90% of the height of the browser and the lower window taking up 10% of the height of the browser). In some examples, the streaming manager 108 encodes the output of the video stream to an advanced video coding (AVC) format, including but not limited to, the H.264 (MPEG-4) video compression format.

Referring momentarily back to FIG. 2, the flow 200 continues at processing block 221, where the game controller 102 receives the video stream and the scale command from the streaming manager 108. The flow 200 continues at processing block 223, where the game controller 102 generates a video signal that includes the game content 113. For instance, as shown in FIG. 1, the game controller 102 generates a video signal that includes the game content 113. In some embodiments, the game controller 102 has access to the game content 113, whereas the display manger 108 does not. In some examples, the game controller 102 renders the game content 113 at the gaming device 110. In other examples, the game controller 102 receives a rendered stream of game content 113 from an external source (e.g., a gaming server).

Referring momentarily back to FIG. 2, the flow 200 continues at processing block 225, wherein the game controller 102 scales the game content 113, and the system-based content 111, using the scale value(s). For example, as described in FIG. 1, the game controller 102 utilizes a scale structure 115 that scales mixed video content to fit to the extents of the screen area of the display device 104. The scale value(s) may be related to both a height and width required for the game content 113 and the system-based content 111. In some instances, as in FIG. 1, the scale structure 115 scales the height of the content such that the game content 113 takes up 90% of the screen area's height (i.e., 90% of the height is allocated for presentation of the game content 113), and the system-based content 111 takes up 10% of the screen area's height (i.e., 10% of the height is allocated for presentation of the system-based content 111). However, regarding the width, the scale structure 115, scales the width of both the game content 113 and the system-based content 111 to take up the entire screen-area width (100% screen-area width for both). Other embodiments, however, include scale values and/or scale structures that scale both the width and height of game content 113 and/or the system-based content 111. In some embodiments, the system-based content 111 and the game content 113 are kept separate from each other. For example, as shown in the scale structure 115, the game content 113 and the system-based content 111 are separated into independent sections (e.g., windows) of the screen area of the display device 104. In other embodiments, the system-based content 111 may overlap and/or encroach into (e.g., be superimposed onto) a portion of the screen area that relates to the game content 113. The game controller 102 and the streaming manager 108 track and use the scale values for scaling the size and position of the different types of content and for transforming touch coordinates from the display device 104.

Referring momentarily back to FIG. 2, the flow 200 continues at processing block 227, where the game controller 102 mixes the video signal (of the game content 113) and the video stream (of the system-based content 111) and sends the composite image 125 (of the mixed video signals) to the display device 104. In other embodiments, the game controller 102 scales the game content 113 and the system-based content 111 and sends the different signals to the display device 104 to mix and present as the composite image 125.

The flow 200 continues at processing block 240, where the display device 104 receives and displays the mixed video. In some instances, where the display device 104 includes a touch display, the flow 200 continues, as previously mentioned, at processing block 242 where the display device 104 detects the touch input 140. In response to detecting the touch input 140, the display device 104 (at processing block 244) transmits coordinates of the touch input 140 to the game controller 102. At processing block 229, the game controller 102 determines whether the touch input 140 was received via the display device 104. If the touch input 140 was not detected, then the flow 200 loops back to processing block 227 where the game controller 102 continues to mix the video signal for the game content 113 with the video stream of system-based content 111 without any intervening touch input. However, if, at processing block 229, the game controller 102 detects the touch input 140 from the display device 104, then the flow 200 continues at processing block 231, where the game controller 102 receives the touch coordinates (of the touch input 140) and determines whether the touch coordinates are associated with an area of the composite image 125 that corresponds to the system-based content 111. If, at processing block 231, the game controller 102 determines that the touch coordinates do not correspond to the area in the composite image 125 associated with the system-based content 111, then the game controller 102 instead determines that the touch coordinates correspond to an area of the composite image 125 associated with the game content 113. Thus, the flow 200 would continue at processing block 235 where the game controller 102 transforms, based on the scale value, the touch coordinates to transformed coordinates that correspond to the unscaled version of the game content 113 (as if the game content 113 took up the entire screen area of the display device 104). The flow 200 then continues at processing block 237 where the game controller 102 performs a game function that corresponds to a touch input at the re-mapped coordinates.

FIG. 3A illustrates an example of the game content 113 as it would appear on the screen area of the display device 104 before the video signal for the game content 113 is mixed with the system-based content 111 and before being presented as the composite image 125. For example, a first point 321 is one extent of the screen area of the display device 104 (e.g., an upper left-hand corner of the screen area of the display device 104). The first point 321 represents an origin point on a two-dimensional grid having two axes, an "x" axis 322 and a "y" axis 323. A second point 331 is an opposing extent of the screen area of the display device 104 (e.g., the second point 331 corresponds to a lower right-hand corner of the screen area of the display device 104). The grid has delineations of space, such as units of physical display size (i.e., physical length units) or units of logical image size (also referred to as display resolution). The display resolution is measured in pixel units, with each individual pixel occupying a pixel-coordinate point. Pixel-coordinate points may be referred to more succinctly in this description as pixel coordinates or points. For instance, the display device 104 may be a display set to a 1024×768 display resolution. Thus, the height of the two-dimensional grid would be divided into 768 pixel units (from 0 to 767) in height and 1024 pixel units (from 0 to 1023) in width (for a landscape-mode orientation). As shown in FIG. 3A, the first point 321 represents, on the two-dimensional grid of coordinates, an origin pixel coordinate of (0, 0) at an upper-left corner of the screen area of the display device 104, whereas the second point 331 represents, on the two-dimensional grid, a lower, right-hand corner, pixel coordinate of (1023, 767) (at an opposing extent of the display resolution to the upper, left-hand pixel coordinate of (0,0)). Thus, in FIG. 3A, the game content 113 fills the entire logical image size of the display device 104 (i.e., the game content 113 in FIG. 3A has a height 324 that is 100% of the height of the logical image also a width of the game content 113 is 100% of the width of the logical image).

To create the composite image 125, according to one embodiment, the game controller 102 scales the height of the game content 113 to a new height 337, which is 90% of its original height 324 and also scales the stream of the system-based content 111 to fit the height 338, which is 10% of the display resolution at the bottom of the screen area. Thus, as shown in FIG. 3B, the first point 321 and the second point 331 remain at the same physical locations relative to the physical screen area, yet the logical image for the game content 113 is scaled and shifted to fit into the top 90% of the screen area. Thus, any touch inputs that are received at the bottom 10% of the display, correspond to the system-based content 111, not to the game content 113. In other words, the game controller 102 can assign, to the game content 113, pixel units of screen area height from the first point 321 at pixel coordinates (0,0) to an additional point 332 at pixel coordinates (1023, 691). The y coordinate of "691" is computed by multiplying the screen area height (H) in pixels by 90% (i.e., screen area height (H)×0.9=768×0.9≈691) The game controller 102 can scale the size of the game content 113 via a first transformation matrix that utilizes the 0.9 value to scale the height factor of the video image of the game content 113 from a 100% value to a 90% value. Concurrently, the game controller 102 can, via a second transformation matrix, scale the portion or the screen area assigned to the system-based content 111 to fit into the 10% of the lower portion of the logical-image height. In some embodiments, the streaming manager 108 is configured to associate the pixel coordinates assigned to the screen area for the system-based content 111 according to the 0.01 (i.e., 10%) scale value used to scale the system-based content 111. To determine where a touch-input occurs that is related to the game content 113, the game controller 102 can utilize an inverse of the first transformation matrix. To determine where a touch input occurs that is related to the system-based content 111, the streaming manager 108, can utilize an inverse of the second transformation matrix In one example, the game controller 102 can, in response to the scaling of the stream of the system-based content 111, assign a point 333 (at pixel coordinates (0,692)) as an origin point for the system-based content 111. The game controller 102 scales the width of the system-based content 111 to stretch to 100% of the screen width, and scales the height, to fit into the lower 10% of the lower screen area, as shown in FIG. 3B. Thus, a touch input 140 (on the physical touch-screen of the display device 104) at a given pixel coordinate in the lower 10% of the screen height can be determined, using the scale values (e.g., transformation matrices), to determine the precise location (in pixel coordinates) of the selected (i.e., touched) portion of the system-based content 111. In the case of FIG. 3B, the selected portion of the system-based content 111 corresponds to the object 341. The streaming manager 108 can perform any operations related to a selection of the object 341, such as to update an image of the system-based content 111 in the video stream according to the operations.

Referring back to the flow 200 at processing block 231, if, at processing block 231, the game controller 102 determines that the touch coordinates correspond to the area of the mixed video presentation that corresponds to the system-based content 111, then the flow 200 continues at processing block 233 where the game controller 102 transmits the coordinates of the touch input 140 to the streaming manager 108 to process the touch input 140 as related to the system-based content 111. As mentioned previously, if, at processing block 206, the streaming manager 108 determines that touch input was received, then, at processing block 208, the streaming manager 108 transforms the coordinates of the touch input 140 based on the scale value (e.g., as described in FIGS. 3A and 3B). The streaming manager 108 can adjust the image of the video stream according to the touch input 140. In some embodiments, the display manger 108 modifies a display resolution for the video stream and/or modifies a property of the video stream to include more data or less data based on various conditions, such as a degree of data required to meet network bandwidth requirements, or a degree of image quality required for presentation of the system-based content 111. Thus, at processing block 210, the streaming manager 108 generates the video stream of system-based content 111 according to the touch input 140. In some instances, the touch input 140 may change the scale for the system-based content 111 relative to the game content 113. For example, if the system-based content 111 requires more of the display area (for clear and complete presentation on the display device 104), the streaming manager 108 can modify the appearance of the system-based content 111 (e.g., can re-render the size, shape, position, etc. of the system-based content 111 differently based on the touch input 140). Based on the necessary modifications to the appearance of the system-based content 111, the streaming manager 108 can also modify the scale value, which the streaming manager 108 then transmits at processing block 212 for the game controller to use at processing block 225.

Figure 4:
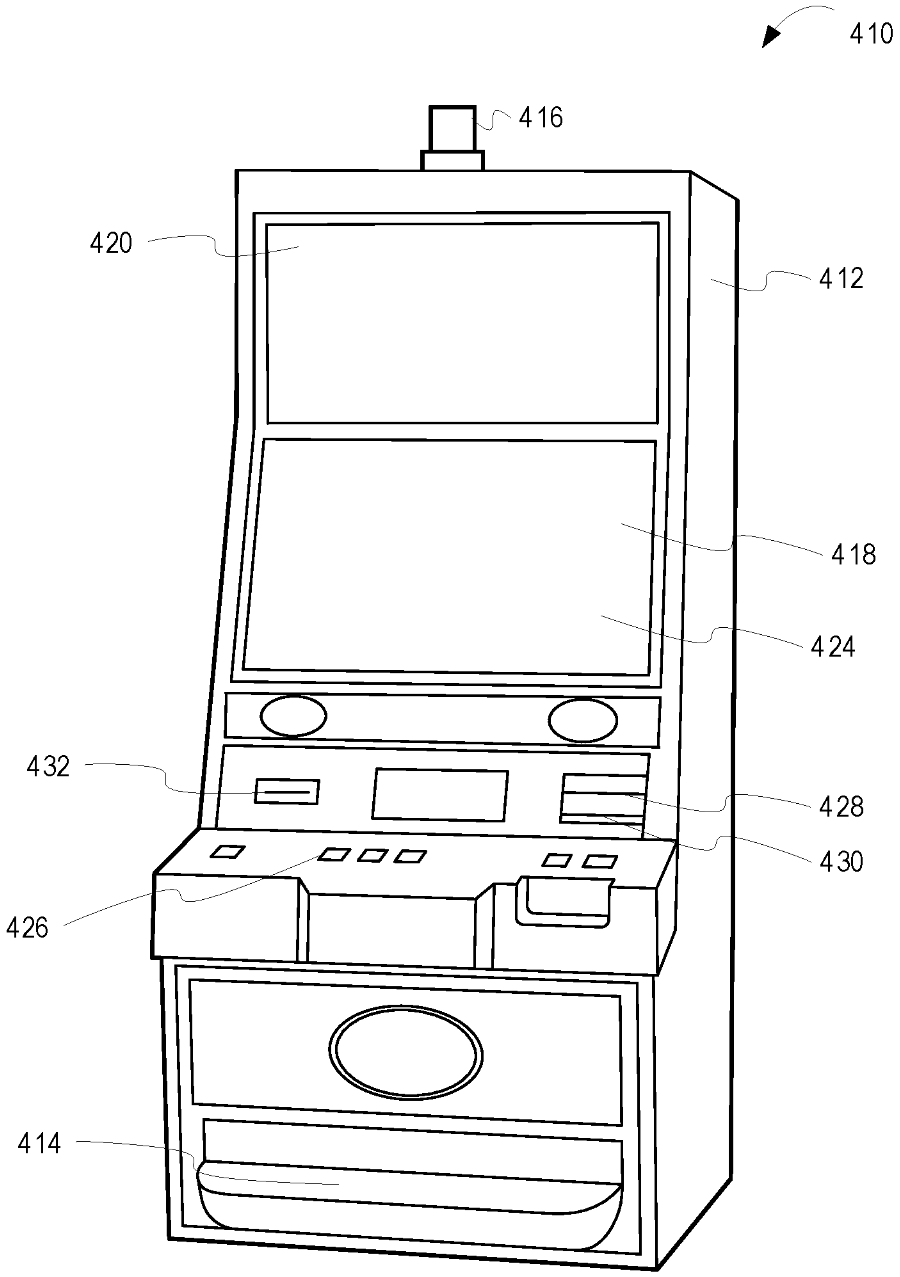
FIG. 4 is a perspective view of a free-standing gaming machine according to at least some aspects of the disclosed concepts.

FIG. 4 is a perspective view of a free-standing gaming machine according to at least some aspects of the disclosed concepts. Referring to FIG. 4, there is shown a gaming machine 410 similar to those operated in gaming establishments, such as casinos. With regard to the present invention, the gaming machine 410 may be any type of gaming terminal or machine and may have varying structures and methods of operation. For example, in some aspects, the gaming machine 410 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 410 may take any suitable form, such as floor-standing models as shown, handheld mobile units, bartop models, workstation-type console models, etc. Further, the gaming machine 410 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 410 illustrated in FIG. 4 comprises a gaming cabinet 412 that securely houses various input devices, output devices, input/output devices, internal electronic/electromechanical components, and wiring. The cabinet 412 includes exterior walls, interior walls and shelves for mounting the internal components and managing the wiring, and one or more front doors that are locked and require a physical or electronic key to gain access to the interior compartment of the cabinet 412 behind the locked door. The cabinet 412 forms an alcove 414 configured to store one or more beverages or personal items of a player. A notification mechanism 416, such as a candle or tower light, is mounted to the top of the cabinet 412. It flashes to alert an attendant that change is needed, a hand pay is requested, or there is a potential problem with the gaming machine 410.

The input devices, output devices, and input/output devices are disposed on, and securely coupled to, the cabinet 412. By way of example, the output devices include a primary display 418, a secondary display 420, and one or more audio speakers 22. The primary display 418 or the secondary display 420 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, email s, alerts, announcements, broadcast information, subscription information, etc. appropriate to the particular mode(s) of operation of the gaming machine 410. The gaming machine 410 includes a touch screen(s) 424 mounted over the primary or secondary displays, buttons 426 buttons 426 on a button panel, a bill/ticket acceptor 428, a card reader/writer 430, a ticket dispenser 432, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 424, buttons 426, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 410 includes one or more value input/payment devices and value output/payout devices. In order to deposit cash or credits onto the gaming machine 410, the value input devices are configured to detect a physical item associated with a monetary value that establishes a credit balance on a credit meter such as the "credits" meter 484 (see FIG. 6). The physical item may, for example, be currency bills, coins, tickets, vouchers, coupons, cards, and/or computer-readable storage mediums. The deposited cash or credits are used to fund wagers placed on the wagering game played via the gaming machine 410. Examples of value input devices include, but are not limited to, a coin acceptor, the bill/ticket acceptor 428, the card reader/writer 430, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 484 (see FIG. 6), the value output devices are used to dispense cash or credits from the gaming machine 410. The credits may be exchanged for cash at, for example, a cashier or redemption station. Examples of value output devices include, but are not limited to, a coin hopper for dispensing coins or tokens, a bill dispenser, the card reader/writer 430, the ticket dispenser 432 for printing tickets redeemable for cash or credits, a wireless communication interface for transmitting cash or credit data to a nearby mobile device, and a network interface for depositing cash or credits to a remote account via an electronic funds transfer.

Figure 5:
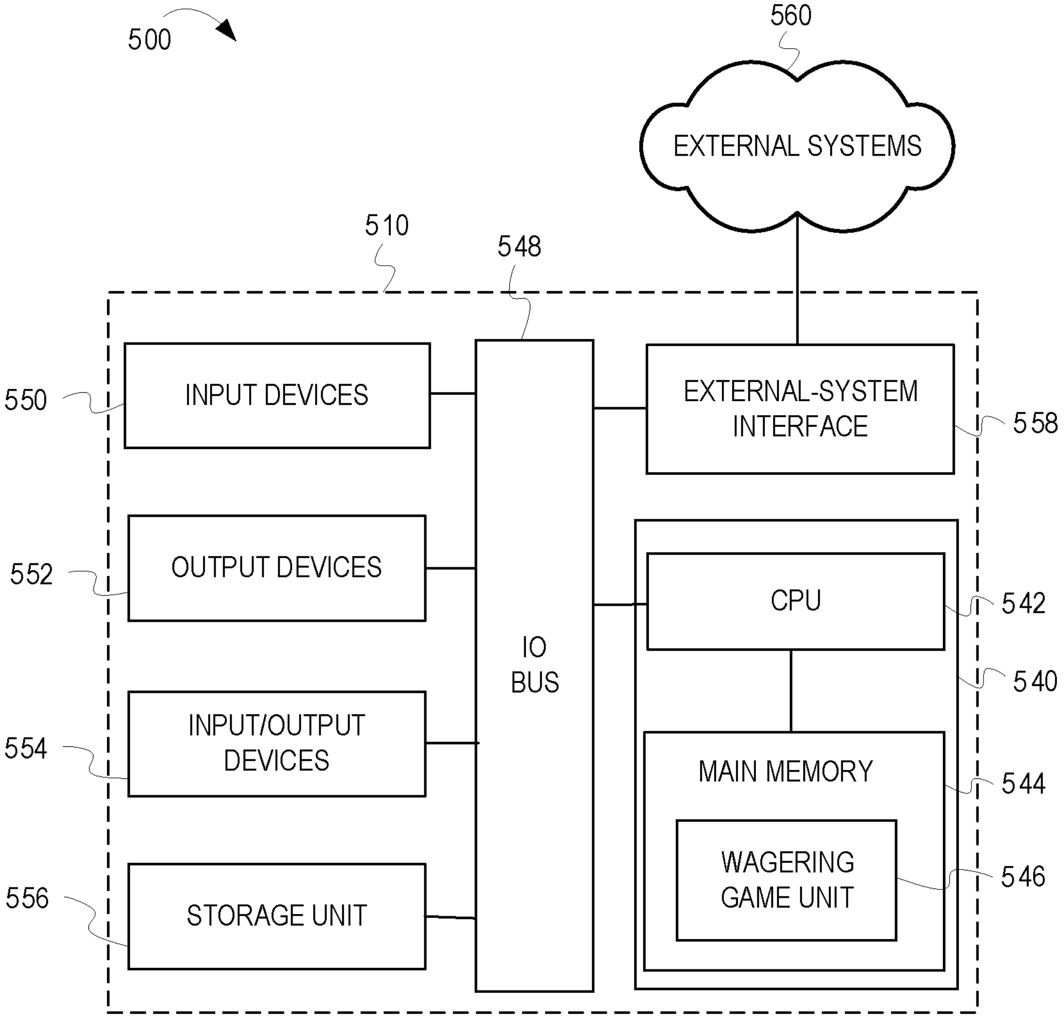
FIG. 5 is a block diagram of the gaming-machine architecture according to some aspects of the disclosed concepts.

Turning now to FIG. 5, there is shown a block diagram of the gaming-machine architecture 500 according to some aspects of the present disclosure. The gaming machine 410 includes game-logic circuitry 540 securely housed within a locked box inside the gaming cabinet 412 (see FIG. 4). The game-logic circuitry 540 includes a central processing unit (CPU) 542 connected to a main memory 544 that comprises one or more memory devices. The CPU 542 includes any suitable processor(s), such as those made by Intel and AMD. By way of example, the CPU 542 includes a plurality of microprocessors including a master processor, a slave processor, and a secondary or parallel processor. Game-logic circuitry 540, as used herein, comprises any combination of hardware, software, or firmware disposed in or outside of the gaming machine 410 that is configured to communicate with or control the transfer of data between the gaming machine 410 and a bus, another computer, processor, device, service, or network. The game-logic circuitry 540, and more specifically the CPU 542, comprises one or more controllers or processors and such one or more controllers or processors need not be disposed proximal to one another and may be located in different devices or in different locations. The game-logic circuitry 540, and more specifically the main memory 544, comprises one or more memory devices which need not be disposed proximal to one another and may be located in different devices or in different locations. The game-logic circuitry 540 is operable to execute all of the various gaming methods and other processes disclosed herein. The main memory 544 includes a wagering-game unit 546. In one embodiment, the wagering-game unit 546 causes wagering games to be presented, such as video poker, video blackjack, video slots, video lottery, etc., in whole or part.

The game-logic circuitry 540 is also connected to an input/output (I/O) bus 548, which can include any suitable bus technologies, such as an AGTL+ frontside bus and a PCI backside bus. The I/O bus 548 is connected to various input devices 550, output devices 552, and input/output devices 554 such as those discussed above in connection with FIG. 4. The I/O bus 548 is also connected to a storage unit 556 and the external-system interface 558, which is connected to external system(s) 560 (e.g., wagering-game networks).

The external system 560 includes, in various aspects, a gaming network, other gaming machines or terminals, a gaming server, a remote controller, communications hardware, or a variety of other interfaced systems or components, in any combination. In yet other aspects, the external system 560 comprises a player's portable electronic device (e.g., cellular phone, electronic wallet, etc.) and the external-system interface 558 is configured to facilitate wireless communication and data transfer between the portable electronic device and the gaming machine 410, such as by a near-field communication path operating via magnetic-field induction or a frequency-hopping spread spectrum RF signals (e.g., Bluetooth, etc.).

The gaming machine 410 optionally communicates with the external system 560 such that the gaming machine 410 operates as a thin, thick, or intermediate client. The game-logic circuitry 540—whether located within ("thick client"), external to ("thin client"), or distributed both within and external to ("intermediate client") the gaming machine 410—is utilized to provide a wagering game on the gaming machine 410. In general, the main memory 544 stores programming for a random number generator (RNG), game-outcome logic, and game assets (e.g., art, sound, etc.)—all of which obtained regulatory approval from a gaming control board or commission and are verified by a trusted authentication program in the main memory 544 prior to game execution. The authentication program generates a live authentication code (e.g., digital signature or hash) from the memory contents and compare it to a trusted code stored in the main memory 544. If the codes match, authentication is deemed a success and the game is permitted to execute. If, however, the codes do not match, authentication is deemed a failure that must be corrected prior to game execution. Without this predictable and repeatable authentication, the gaming machine 410, external system 560, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 542 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 542 when executing the game-outcome logic to determine a resultant outcome for that instance of the wagering game. The resultant outcome is then presented to a player of the gaming machine 410 by accessing the associated game assets, required for the resultant outcome, from the main memory 544. The CPU 542 causes the game assets to be presented to the player as outputs from the gaming machine 410 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 410 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 410 may include additional peripheral devices or more than one of each component shown in FIG. 5. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 6:
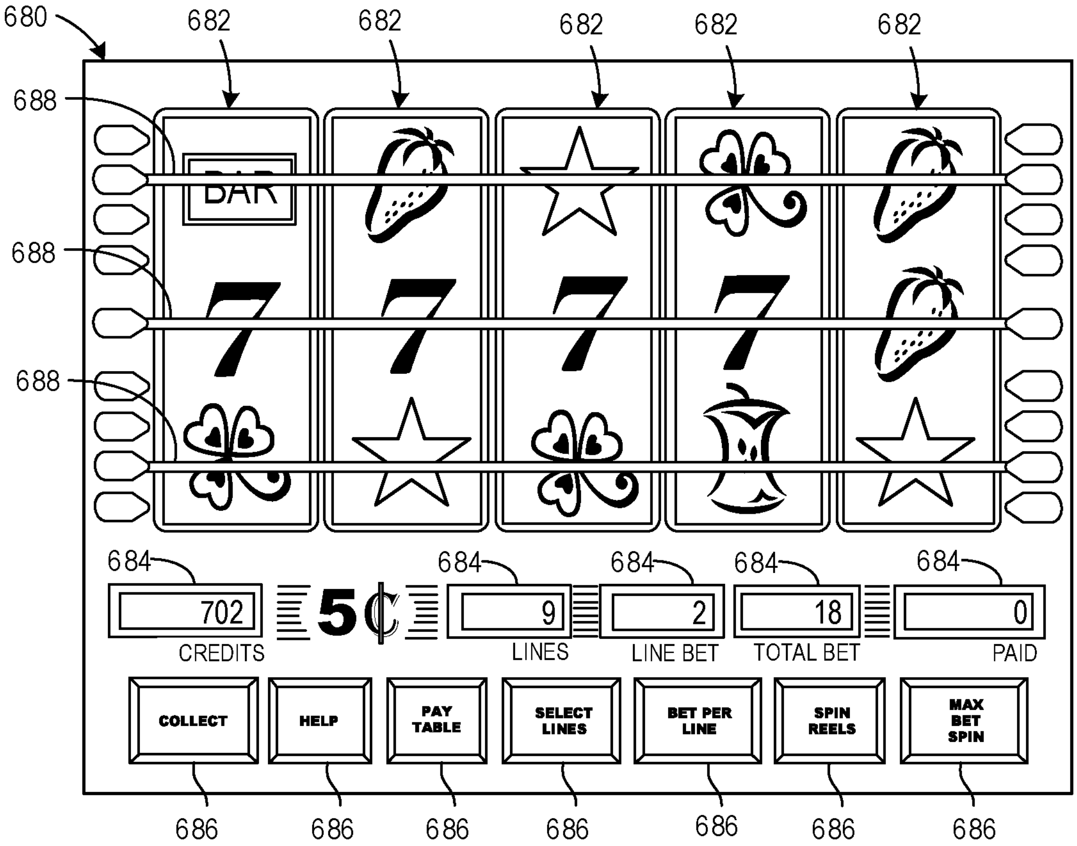
FIG. 6 is an image of an exemplary basic-game screen of a wagering game displayed on a gaming machine, according to some aspects of the disclosed concepts.

Referring now to FIG. 6, there is illustrated an image of a basic-game screen 680 adapted to be displayed on the primary display 418 or the secondary display 420. The basic-game screen 680 portrays a plurality of simulated symbol-bearing reels 682. Alternatively or additionally, the basic-game screen 680 portrays a plurality of mechanical reels or other video or mechanical presentation consistent with the game format and theme. The basic-game screen 680 also advantageously displays one or more game-session credit meters 684 and various touch screen buttons 686 adapted to be actuated by a player. A player can operate or interact with the wagering game using these touch screen buttons or other input devices such as the buttons 426 shown in FIG. 4. The game-logic circuitry 540 operates to execute a wagering-game program causing the primary display 418 or the secondary display 420 to display the wagering game.

In response to receiving an input indicative of a wager covered by or deducted from the credit balance on the "credits" meter 484, the reels 682 are rotated and stopped to place symbols on the reels in visual association with paylines such as paylines 688. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 410 depicted in FIG. 4, following receipt of an input from the player to initiate a wagering-game instance. The gaming machine 410 then communicates the wagering-game outcome to the player via one or more output devices (e.g., primary display 418 or secondary display 420) through the display of information such as, but not limited to, text, graphics, static images, moving images, etc., or any combination thereof. In accord with the method of conducting the wagering game, the game-logic circuitry 540 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 540 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 542 causes the recording of a digital representation of the wager in one or more storage media (e.g., storage unit 556), the CPU 542, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 542 (e.g., the wager in the present example). As another example, the CPU 542 further, in accord with the execution of the stored instructions relating to the wagering game, causes the primary display 418, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 540 to determine the outcome of the wagering-game instance. In at least some aspects, the game-logic circuitry 540 is configured to determine an outcome of the wagering-game instance at least partially in response to the random parameter.

In one embodiment, the gaming machine 410 and, additionally or alternatively, the external system 560 (e.g., a gaming server), means gaming equipment that meets the hardware and software requirements for fairness, security, and predictability as established by at least one state's gaming control board or commission. Prior to commercial deployment, the gaming machine 410, the external system 560, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 410 may be implemented with hardware and software architectures, circuitry, and other special features that differentiate it from general-purpose computers (e.g., desktop PCs, laptops, and tablets).

FIG. 2, described by way of example above, represents one algorithm that corresponds to at least some instructions stored and executed by the game-logic circuitry 540 in FIG. 5 to perform the above described functions associated with the disclosed concepts.

Any component of any embodiment described herein may include hardware, software, or any combination thereof.

Further, the operations described herein can be performed in any sensible order. Any operations not required for proper operation can be optional. Further, all methods described herein can also be stored as instructions on a computer readable storage medium, which instructions are operable by a computer processor. All variations and features described herein can be combined with any other features described herein without limitation. All features in all documents incorporated by reference herein can be combined with any feature(s) described herein, and also with all other features in all other documents incorporated by reference, without limitation.

Features of various embodiments of the inventive subject matter described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments which are defined only by the appended claims. Further, since numerous modifications and changes may readily occur to those skilled in the art, it is not desired to limit the inventive subject matter to the exact construction and operation illustrated and described, and accordingly all suitable modifications and equivalents may be resorted to, falling within the scope of the inventive subject matter.

What is claimed is:

1. A system comprising:

an electronic display manager configured to generate, in response to receiving user input, a video stream of system-based content; and an electronic game controller communicatively coupled to the electronic display manager via an external-system interface, wherein the electronic game controller is configured to execute instructions that cause the system to perform operations to:

receive the video stream via the external-system interface, generate a video signal of game content for a wagering game, scale the video stream according to one or more scale values that relate a size of the system-based content to a size of the game content, and mix the video stream and the video signal into a composite image for presentation via a display device communicatively coupled to the electronic game controller.

2. The system of claim 1, wherein the electronic game controller is further configured to execute instructions that cause the system to perform operations to receive, via the external-system interface, an electronic command that includes the one or more scale values.

3. The system of claim 1, wherein the electronic game controller is further configured to execute instructions that cause the system to perform operations to:

use a first scale value, from the one or more scale values, to scale the video stream to a size of a first window in a browser;

use a second scale value, from the one or more scale values, to scale the video signal to a size of a second window in the browser; and render, according to a display resolution for the display device, the browser with the video stream scaled to the first scale value via the first window concurrently with the video signal scaled to the second scale value via the second window.

4. The system of claim 1, wherein the electronic game controller is further configured to execute instructions that cause the system to perform one or more operations to:

detect, via a sensor of the display device, a touch input;

determine, based on the one or more scale values, that coordinates of the touch input correspond to a portion of the system-based content; and transmit, via the external-system interface, the coordinates of the touch input to the display manager, wherein the display manager is further configured to determine, based on the one or more scale values and based on the coordinates, a function associated with the portion of the system-based content, modify an appearance of the system-based content in response to performance of the function, and re-render the video stream in response to modification of the appearance of the system-based content.

5. The system of claim 4, wherein the electronic display manager is further configured to:

change, in response to modification of the appearance of the system-based content, the one or more scale values to one or more additional scale values different from the one or more scale values, wherein the one or more additional scale values relate a size of the modified system-based content to a size of the game content; and transmit, to the game controller via the external-system interface, the one or more additional scale values, wherein the game controller is further configured to scale the video stream according to the one or more additional scale values.

6. The system of claim 1, wherein the electronic game controller is further configured to execute instructions that cause the system to perform one or more operations to:

detect, via a sensor of the display device, a touch input;

determine, based on the one or more scale values, that coordinates of the touch input correspond to a portion of the game content;

perform a wagering-game function associated with the portion of the game content that corresponds to the coordinates; and re-mix the video stream and the video signal in response to performance of the wagering-game function.

7. A method comprising:

detecting, by a processor in response to reception of an input signal generated by a sensor at a gaming device, a user input associated with presentation of system-based content;

generating, via the processor in response to detection of the user input, at least one scale command that specifies a scale value;

rendering, via the processor in response to the user input, images of the system-based content;

encoding, via the processor, the images of the rendered system-based content into a video stream; and transmitting, by processor via an external-system interface, the at least one scale command and the video stream to the gaming device, wherein the gaming device is configured to generate a video signal that includes images of game content, mix the video stream and the video signal for concurrent presentation of the game content and the system-based content via a display device of the gaming device, and scale, using the scale value, a size of the images of the gaming content on the display relative to the images of the system-based content.

8. The method of claim 7 further comprising:
receiving, via the external-system interface, coordinates of a touch input with the display;
transforming, using the scale value, the coordinates;
determining, based on the transforming, a selection of at least a portion of the system-based content; and
rendering the images of the system-based content based on the selection.

9. The method of claim 8 further comprising:
determining, using the scale value, that the coordinates corresponds to a portion of the system-based content; and
transmitting the indication of the touch interaction in response to determination that the touch interaction corresponds to the portion of the system-based content.

10. The method of claim 7 further comprising:
rendering, via the processor, the images of the system-based content at a first resolution, wherein the gaming device is further configured to reduce, based on presentation parameters for the game content, the first resolution of the video stream to a second resolution prior to mixing the video stream and the video signal.

11. One or more non-transitory, computer-readable mediums storing instructions that, when executed by a processor, cause a gaming system to perform operations comprising:
detecting, in response to reception of an input signal generated by a sensor at a gaming device, a user input associated with presentation of system-based content;
generating, in response to detection of the user input, at least one scale command that specifies a scale value;
rendering, in response to the user input, images of the system-based content;
encoding the images of the rendered system-based content into a video stream; and
transmitting, via an external-system interface, the at least one scale command and the video stream to the gaming device, wherein the gaming device is configured to generate a video signal that includes images of game content,
mix the video stream and the video signal for concurrent presentation of the game content and the system-based content via a display device of the gaming device, and
scale, using the scale value, a size of the images of the gaming content on the display relative to the images of the system-based content.

12. The one or more non-transitory, computer-readable mediums of claim 11, wherein the instructions, when executed by the processor, cause gaming system to perform operations comprising:
receiving, via the external-system interface, coordinates of a touch input with the display;
transforming, using the scale value, the coordinates;
determining, based on the transforming, a selection of at least a portion of the system-based content; and
rendering the images of the system-based content based on the selection.

13. The one or more non-transitory, computer-readable mediums of claim 12, wherein the instructions, when executed by the processor, cause gaming system to perform operations comprising:
determining, using the scale value, that the coordinates corresponds to a portion of the system-based content; and
transmitting the indication of the touch interaction in response to determination that the touch interaction corresponds to the portion of the system-based content.

14. The one or more non-transitory, computer-readable mediums of claim 11, wherein the instructions, when executed by the processor, cause gaming system to perform operations comprising:
rendering the images of the system-based content at a first resolution, wherein the gaming device is further configured to reduce, based on presentation parameters for the game content, the first resolution of the video stream to a second resolution prior to mixing the video stream and the video signal.

* * * * *